United States Patent
Kawate et al.

(10) Patent No.: US 11,773,200 B2
(45) Date of Patent: Oct. 3, 2023

(54) METHOD FOR PRODUCING HYDROGENATED PETROLEUM RESIN

(71) Applicant: MARUZEN PETROCHEMICAL CO., LTD., Chuo-ku (JP)

(72) Inventors: Takahiro Kawate, Ichihara (JP); Yoshikazu Iijima, Ichihara (JP)

(73) Assignee: MARUZEN PETROCHEMICAL CO., LTD., Chuo-ku (JP)

( * ) Notice: Subject to any disclaimer, the term of this patent is extended or adjusted under 35 U.S.C. 154(b) by 393 days.

(21) Appl. No.: 17/041,189

(22) PCT Filed: Mar. 27, 2019

(86) PCT No.: PCT/JP2019/013077
§ 371 (c)(1),
(2) Date: Sep. 24, 2020

(87) PCT Pub. No.: WO2019/189295
PCT Pub. Date: Oct. 3, 2019

(65) Prior Publication Data
US 2021/0024676 A1    Jan. 28, 2021

(30) Foreign Application Priority Data

Mar. 28, 2018 (JP) ................................ 2018-061565

(51) Int. Cl.
| | | |
|---|---|---|
| *C08F 8/04* | (2006.01) | |
| *C08F 240/00* | (2006.01) | |
| *C08F 232/08* | (2006.01) | |
| *C08F 4/44* | (2006.01) | |
| *C08F 4/80* | (2006.01) | |
| *C08F 232/06* | (2006.01) | |
| *C08F 212/08* | (2006.01) | |

(52) U.S. Cl.
CPC .............. *C08F 240/00* (2013.01); *C08F 4/44* (2013.01); *C08F 4/80* (2013.01); *C08F 8/04* (2013.01); *C08F 232/08* (2013.01); *C08F 212/08* (2013.01); *C08F 232/06* (2013.01)

(58) Field of Classification Search
CPC .... C08F 232/08; C08F 232/06; C08F 212/08; C08F 8/04; C08F 240/00
See application file for complete search history.

(56) References Cited

U.S. PATENT DOCUMENTS

| | | | | |
|---|---|---|---|---|
| 5,502,140 A * | 3/1996 | Daughenbaugh | ........ | C09J 11/08 |
| | | | | 526/335 |
| 7,196,143 B2 * | 3/2007 | Fujioka | ................... | C08G 61/06 |
| | | | | 526/87 |
| 8,772,444 B2 * | 7/2014 | Takasugi | ................... | B29B 9/10 |
| | | | | 528/502 R |
| 9,644,043 B2 * | 5/2017 | Miyamoto | ................ | C08F 6/10 |
| 9,994,650 B2 * | 6/2018 | Iijima | .................... | C08F 232/06 |
| 10,457,764 B2 * | 10/2019 | Kameyama | ............ | C09J 115/00 |
| 11,485,803 B2 * | 11/2022 | Hayashi | ................. | C08F 212/08 |
| 2005/0228143 A1 * | 10/2005 | Yamakawa | ............ | C10G 45/10 |
| | | | | 502/223 |
| 2006/0063892 A1 * | 3/2006 | Yamane | ................. | C08F 212/08 |
| | | | | 526/346 |
| 2017/0096501 A1 | 4/2017 | Iijima et al. | | |

FOREIGN PATENT DOCUMENTS

| | | | | | |
|---|---|---|---|---|---|
| CN | 107778389 A | * | 3/2018 | ............ | C08F 240/00 |
| EP | 3 438 137 A1 | | 2/2019 | | |
| JP | 6-322020 A | * | 11/1994 | ................ | C08F 8/04 |
| JP | 2762209 B2 | | 6/1998 | | |
| JP | 2004-16946 A | | 1/2004 | | |
| JP | 2004-26969 A | * | 1/2004 | ............ | C08F 232/00 |
| JP | 2004-189764 A | | 7/2004 | | |
| JP | 2004189764 A | * | 7/2004 | ............ | C08F 232/00 |
| JP | 2004-359964 A | | 12/2004 | | |
| JP | 3971468 B2 | | 9/2007 | | |
| WO | WO 2015/147027 A1 | | 10/2015 | | |
| WO | WO 2017/171025 A1 | | 10/2017 | | |

OTHER PUBLICATIONS

International Search Report dated Jun. 11, 2019 in PCT/JP2019/013077 filed Mar. 27, 2019, 2 pages.

* cited by examiner

*Primary Examiner* — Rip A Lee
(74) *Attorney, Agent, or Firm* — Oblon, McClelland, Maier & Neustadt, L.L.P.

(57) ABSTRACT

Provided is a method for producing a hydrogenated petroleum resin having good compatibility with a base polymer and a good hue under a hydrogen pressure of 4 MPaG or less. A method for producing a hydrogenated petroleum resin, includes a hydrogenation step of hydrogenating a polymerization product of dicyclopentadiene and a vinyl aromatic compound in the presence of a catalyst, in which hydrogenation step is performed under conditions (A) to (C): (A) an amount of the catalyst used: 0.125 to 0.4 parts by mass relative to 100 parts by mass of a resin in the polymerization product, (V) a reaction pressure: 4 MPaG or less, and (C) a reaction temperature: 240° C. or higher.

8 Claims, No Drawings

METHOD FOR PRODUCING HYDROGENATED PETROLEUM RESIN

TECHNICAL FIELD

The present invention relates to a method for producing a hydrogenated petroleum resin. More specifically, the present invention relates to a method for producing a dicyclopentadiene/vinyl aromatic compound-based hydrogenated petroleum resin, including hydrogenating a polymerization product of dicyclopentadiene and a vinyl aromatic compound.

BACKGROUND ART

A hot melt adhesive is widely used in the fields of, for example, bookbinding, packaging, can making, sewing, and sanitary materials, because it provides adhesion quickly, is solvent-free and harmless, and has excellent weatherability, heat resistance, and economic efficiency.

Generally, components of a hot melt adhesive are roughly classified into, for example, a base polymer, a tackifying resin, a plasticizer, a filler, and an antioxidant. Among them, the tackifying resin is known to greatly contribute to the performance of a hot melt adhesive.

The tackifying resin imparts wetting and hot tack during melt coating, and improves the adhesiveness to the surface of the adherend. The tackifying resin is blended into a hot melt adhesive at a high proportion, because the tackifying resin has properties that achieve improvement of workability and adjustment of heat resistance during a hot melt process by the control of the melting viscosity when forming hot melts.

Resins used as a tackifying resin are roughly classified into rosin, rosin derivatives, terpene resins, and petroleum resins. Recently, petroleum resins, which are excellent in, for example, compatibility, heat resistance, safety, and cost, are often used due to demand as sanitary materials such as a disposable diaper.

As petroleum resins, aliphatic petroleum resins, aromatic petroleum resins, and dicyclopentadiene petroleum resins are often used. Because non-hydrogenated resins are inferior in a hue and heat resistance, and thus, usually, these petroleum resins are often hydrogenated and used. Properties required for a tackifying resin include viscosity, adhesiveness, compatibility, heat resistance, weatherability, a hue, a softening point, an odor or the like. Among them, the compatibility with the base polymer and the hue are particularly important when used as a hot melt adhesive for sanitary materials.

CITATION LIST

Patent Literature

Patent Literature 1: JP 3971468 B2
Patent Literature 2: JP 2762209 B2
Patent Literature 3: JP-A 2004-359964
Patent Literature 4: JP-A 2004-189764
Patent Literature 5: WO 2015/147027 A1

SUMMARY OF INVENTION

Technical Problem

However, when the compatibility with a base polymer is improved, the hue tends to deteriorate. Thus, it is difficult to produce a hydrogenated petroleum resin having both good compatibility with a base polymer and a good hue. For example, in general hydrogenation, at least about 0.5 parts by mass of a catalyst is used relative to 100 parts by mass of a resin (Patent Literatures 1 to 4). In such a case where a large amount of catalyst is used, not only does the production cost increase, but also the compatibility with the base polymer tends to be poor.

Because increasing the hydrogen pressure leads to the increase in the device cost for implementation, the realization of hydrogenation under a low hydrogen pressure is also required. Though the production of a hydrogenated petroleum resin under a low hydrogen pressure of 4 MPaG or less has been performed so far (Patent Literature 5), the production method under a low hydrogen pressure and low temperature disclosed in Patent Literature 5 has room for improvement in the hue of the hydrogenated petroleum resin.

It is an object of the present invention to provide a method for producing a hydrogenated petroleum resin having good compatibility with a base polymer and a good hue under a hydrogen pressure of 4 MPaG or less.

Solution to Problem

As a result of intensive studies to solve the above-mentioned problems, the present inventors found that a hydrogenated petroleum resin having good compatibility with a base polymer and a good hue can be produced under a hydrogen pressure of 4 MPaG or less by hydrogenating a polymerization product of dicyclopentadiene and a vinyl aromatic compound under a reaction temperature of 240° C. or higher using 0.125 to 0.4 parts by mass of a catalyst relative to 100 parts by mass of a resin in the polymerization product of dicyclopentadiene and a vinyl aromatic compound, thereby completing the present invention.

That is, the present invention provides <1> to <3> below.

<1> A method for producing a hydrogenated petroleum resin, including: a hydrogenation step of hydrogenating a polymerization product of dicyclopentadiene and a vinyl aromatic compound in the presence of a catalyst, in which the hydrogenation step is performed under conditions (A) to (C) below:

(A) an amount of the catalyst used: 0.125 to 0.4 parts by mass relative to 100 parts by mass of a resin in the polymerization product;
(B) a reaction pressure: 4 MPaG or less; and
(C) a reaction temperature: 240° C. or higher.

<2> The method according to <1>, wherein the catalyst is a palladium catalyst or a nickel catalyst.

<3> The method according to <1> or <2>, wherein the polymerization product of dicyclopentadiene and a vinyl aromatic compound is obtained by thermally polymerizing dicyclopentadiene and a vinyl aromatic compound.

Advantageous Effects of Invention

According to the method of production of the present invention, a hydrogenated petroleum resin having good compatibility with a base polymer and a good hue can be produced under a hydrogen pressure of 4 MPaG or less. Because the hydrogen pressure is low, and in addition, the amount of a catalyst used is small, a hydrogenated petroleum resin having good compatibility and hue as described above can be produced at low cost.

DESCRIPTION OF EMBODIMENTS

The method for producing a hydrogenated petroleum resin of the present invention is a method for producing a hydrogenated petroleum resin, including: a hydrogenation step of hydrogenating a polymerization product of dicyclopentadiene and a vinyl aromatic compound in the presence of a catalyst, in which the hydrogenation step is performed under conditions (A) to (C) below:

(A) an amount of the catalyst used: 0.125 to 0.4 parts by mass relative to 100 parts by mass of a resin in the polymerization product;

(B) a reaction pressure: 4 MPaG or less; and (C) a reaction temperature: 240° C. or higher.

Examples of the polymerization product of dicyclopentadiene and a vinyl aromatic compound include those obtained by thermally polymerizing dicyclopentadiene and a vinyl aromatic compound.

As a method for producing a hydrogenated petroleum resin of the present invention, preferable is a method including: a step of thermally polymerizing dicyclopentadiene and a vinyl aromatic compound (thermal polymerization step); and then a hydrogenation step of hydrogenating an obtained polymerization product in the presence of a catalyst under conditions (A) to (C) above. The hydrogenation step may be performed after light components are removed from the polymerization product obtained in the thermal polymerization step (light component removal step), and a solvent is added (solvent addition step), as needed.

Hereinafter, each step will be described in detail.

(a) Thermal Polymerization Step

The thermal polymerization step is a step of thermally polymerizing dicyclopentadiene and a vinyl aromatic compound. Examples of the vinyl aromatic compound include vinyl aromatic compounds represented by Formula (1) below.

In the method for producing a hydrogenated petroleum resin of the present invention, a preliminary reaction can be performed before the thermal polymerization.

Examples of the preliminary reaction include a reaction in which dicyclopentadiene is reacted with a vinyl aromatic compound represented by Formula (1) below to obtain a reaction liquid containing a phenylnorbornene derivative represented by Formula (2) below, a reaction product thereof.

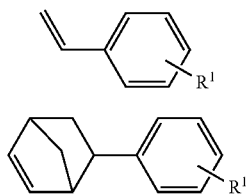

In Formulas (1) and (2), $R^1$ represents a hydrogen atom, an alkyl group, a cycloalkyl group, an aryl group or an aralkyl group, and is preferably a hydrogen atom.

The alkyl group represented by $R^1$ is preferably an alkyl group having 1 to 10 carbon atoms, and more preferably an alkyl group having 1 to 7 carbon atoms. The alkyl group can be linear or branched, and examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an isohexyl group, and an n-heptyl group.

As the cycloalkyl group, a cycloalkyl group having 3 to 7 carbon atoms is preferable. Examples thereof include a cyclopentyl group, a cyclohexyl group, and a cycloheptyl group.

Examples of the aryl group include an aryl group having 6 to 12 carbon atoms such as a phenyl group, a tolyl group, a xylyl group, and a naphthyl group. Examples of the aralkyl group include an aralkyl group having 7 to 20 carbon atoms such as a benzyl group, a phenethyl group, and a naphthylmethyl group.

Specific examples of the vinyl aromatic compound used in the present invention include styrene, p-methylstyrene, and p-tert-butylstyrene, and the vinyl aromatic compound is preferably styrene. The vinyl aromatic compound can contain a stabilizer such as a polymerization inhibitor.

The dicyclopentadiene used in the present invention is not particularly limited, and for example, a high-purity dicyclopentadiene fraction containing 30 to 100% by mass of dicyclopentadiene or a crude dicyclopentadiene fraction can be used as a dicyclopentadiene raw material. A mixture of dicyclopentadiene and cyclopentadiene can be also used.

Among such dicyclopentadiene raw materials, those having a high concentration of reactive components such as dicyclopentadiene and codimer are preferable in terms of the yield of the resin obtained by thermal polymerization. However, an inexpensive crude dicyclopentadiene fraction containing non-reactive components such as C5 and C6 paraffins can also be used.

Though the preliminary reaction can be performed without using a reaction solvent, the composition can be adjusted by adding a solvent.

As such a solvent, for example, aromatic solvents such as benzene, toluene, and xylene; naphthene solvents such as cyclohexane, dimethylcyclohexane (hereinafter referred to as DMCH), and ethylcyclohexane can be suitably used.

The preliminary reaction between the vinyl aromatic compound and dicyclopentadiene is preferably performed at 170° C. or higher. When the reaction temperature is 170° C. or higher, dicyclopentadiene is sufficiently thermally decomposed and the progress of the reaction is promoted, so that the phenylnorbornene derivative is efficiently produced.

From the viewpoint of reducing the concentration of the vinyl aromatic compound in the reaction system and suppressing the production of the homopolymer of the vinyl aromatic compound, the reaction is preferably performed by dropping (divided addition or continuous addition) a liquid containing a vinyl aromatic compound into dicyclopentadiene heated to 170° C. or higher.

Specifically, it is preferable that a predetermined amount of dicyclopentadiene be placed in a reaction vessel in advance, and heated to the reaction temperature above, and then a liquid containing a vinyl aromatic compound be dividedly or continuously dropped for the reaction while maintaining the temperature.

The liquid to be dropped can contain only a vinyl aromatic compound, or can contain a vinyl aromatic compound and dicyclopentadiene, and other solvents. As the dicyclopentadiene, the above-mentioned dicyclopentadiene raw material can be used. The dicyclopentadiene placed in advance in the reaction vessel and the dicyclopentadiene used in the dropping liquid can have the same composition or different compositions.

The ratio of the amount used of dicyclopentadiene to be placed in advance in the reaction vessel to the amount used of the dropping solution, and the ratio of the amount used of the dicyclopentadiene to the amount used of a vinyl aromatic compound in the dropping liquid when the dropping liquid contains dicyclopentadiene are appropriately set according to the target value of the aromatic content of the resin obtained. The dropping liquid is preferably in the range of 20 to 150 parts by mass relative to 100 parts by mass of the amount placed in the reaction vessel. When the amount used of the dropping liquid is 20 parts by mass or more, the aromatic content of the obtained resin will be sufficient. When the amount used of the dropping liquid is 150 parts by mass or less, the concentration of the vinyl aromatic compound at the time of dropping is low, and further the local temperature increase due to the heat of reaction is suppressed, so that the decrease in the selectivity of the phenylnorbornene derivative can be prevented.

The amount of all dicyclopentadiene supplied to the reaction system with the vinyl aromatic compound can be appropriately selected according to the target value of the aromatic content of the resin obtained. The vinyl aromatic compound is preferably 15 to 130 parts by mass, more preferably 30 to 90 parts by mass relative to 100 parts by mass of dicyclopentadiene.

The time for dropping is preferably 1 to 4 hours. When dropping time is 1 hour or more, the concentration of the vinyl aromatic compound in the reaction liquid system is low, and further the rapid temperature increase due to the heat of reaction is suppressed, so that the decrease in the selectivity of the phenylnorbornene derivative can be prevented. Thereby, homopolymers tend not to be produced in the subsequent polymerization step. When the dropping time is 4 hours or less, homopolymerization of dicyclopentadiene tends not to proceed. Thereby, high molecular weight substances tend not to be produced in the subsequent polymerization step.

The dropping is preferably performed while stirring the system so that the temperature in the reaction vessel is kept uniform and the concentration of the vinyl aromatic compound does not locally increase.

Examples of the thermal polymerization include thermal polymerization in which the reaction liquid containing the phenylnorbornene derivative obtained in the preliminary reaction is heated to 240 to 300° C.

The thermal polymerization at 240 to 300° C. facilitates the reaction at an appropriate polymerization rate. From the viewpoint of the polymerization rate, the temperature is more preferably 250 to 280° C. The polymerization time is preferably 0.5 to 4 hours, more preferably 1 to 3 hours.

The thermal polymerization can be performed without a solvent as follows: the reaction liquid in the reaction vessel used in the preliminary reaction is kept and heated to polymerization temperature. The reaction liquid obtained in the preliminary reaction can be transferred to another polymerization vessel to be thermally polymerized.

After a thermal polymerization reaction product is obtained in the thermal polymerization step (a), a light component removal step (b) and/or a solvent addition step (c) is preferably performed prior to the hydrogenation step.

(b) Light Component Removal Step

The light component removal step is a step of removing light components from the polymerization product obtained in the thermal polymerization step. By this step, unreacted light components and oligomers as well as the polymerization solvent (only when used) can be removed from the thermal polymerization reaction product.

The method for removing, for example, light components is not particularly limited, and examples thereof include simple distillation, flash distillation, thin film distillation, and molecular distillation.

The softening point of the thermal polymerization reaction product after the removal of light components, for example, is usually 50 to 120° C., preferably 60 to 100° C., and more preferably 70 to 90° C. For the molecular weight, the Z-average molecular weight (Mz) is usually 1200 to 2600, preferably 1400 to 2400, and more preferably 1600 to 2200.

(c) Solvent Addition Step

The solvent addition step is a step of dissolving the thermal polymerization reaction product from which light components, for example, have been removed in a solvent to obtain a hydrogenation raw material containing the thermal polymerization reaction product and the solvent.

The solvent in which the thermal polymerization reaction product is dissolved is preferably one that dissolves the thermal polymerization reaction product, does not react with the catalyst used in the hydrogenation step, and is easily separated from the resin after the hydrogenation treatment. Specific examples thereof include alicyclic hydrocarbons such as cyclohexane, methylcyclohexane, ethylcyclohexane, and DMCH.

The amount of the solvent used is preferably 0 to 900 parts by mass, more preferably 30 to 800 parts by mass, and particularly preferably 40 to 700 parts by mass relative to 100 parts by mass of the thermal polymerization reaction product after the light component removal step.

(d) Hydrogenation Step

The hydrogenation step is a step of hydrogenating a polymerization product of dicyclopentadiene and a vinyl aromatic compound in the presence of a catalyst under conditions (A) to (C) below. Hydrogen is added to the double bond in the polymerization product.

(A) an amount of the catalyst used: 0.125 to 0.4 parts by mass relative to 100 parts by mass of a resin in the polymerization product;

(B) a reaction pressure: 4 MPaG or less; and (C) a reaction temperature: 240° C. or higher.

By hydrogenating a polymerization product under conditions (A) and (C) as described above, a hydrogenated petroleum resin having good compatibility with a base polymer and a good hue can be produced under a hydrogen pressure of 4 MPaG or less.

The reason why such an effect is obtained is not always clear. The present inventors presume that by the condition (A), the excessive decrease in the aromatic content is suppressed and the compatibility with the base polymer becomes good, and by combining the condition (A) with the condition (C), the hue becomes good even at a hydrogen pressure of 4 MPaG or less.

The reaction type of the hydrogenation step can be a batch type or a continuous system, and is preferably a batch type. That is, a batch reactor and a flow continuous reactor, for example, can be used, and a batch reactor is preferably used.

(Condition (A))

An amount of the catalyst used in the hydrogenation step is 0.125 to 0.4 parts by mass relative to 100 parts by mass of the resin in the polymerization product.

The amount of the catalyst used is preferably 0.15 to 0.3 parts by mass, more preferably 0.15 to 0.25 parts by mass, and particularly preferably 0.15 to 0.2 parts by mass, from the viewpoint of enhancing the desired effect.

When a supported catalyst is used as the catalyst, the "amount of the catalyst used" means the total amount of the supported catalyst and the carrier used.

As the catalyst used in the hydrogenation step, generally known catalysts such as nickel, palladium, cobalt, platinum, and rhodium catalysts can be used. Among these, a nickel catalyst and a palladium catalyst are preferable. The nickel catalyst and the palladium catalyst can be those generally industrially available, and can be in a reduced state or a stabilized state.

The catalyst can be used with being supported on any carrier. Examples of the carrier include alumina, silica, silica-alumina, zeolite, diatomaceous earth, clay minerals (such as montmorillonite), and silicon carbide. The carrier is preferably a porous carrier.

When nickel or nickel oxide is supported on a carrier, the supported amount is preferably 10 to 70% by mass, more preferably 40 to 60% by mass.

When palladium is supported on the carrier, the supported amount is preferably 0.01 to 50% by mass, more preferably 0.05 to 20% by mass, and further preferably 0.1 to 10% by mass.

(Condition (B))

The hydrogen pressure in the hydrogenation step is 4 MPaG or less. When the hydrogen pressure is more than 4 MPaG, the instrument cost for implementation increases, and the softening point does not easily fall within an appropriate range.

The hydrogen pressure is preferably normal pressure to 4 MPaG, more preferably 1 to 4 MPaG, and particularly preferably 1 to 2 MPaG from the viewpoint of enhancing the desired effect.

(Condition (C))

The reaction temperature in the hydrogenation step is 240° C. or higher. The reaction temperature is preferably 240 to 300° C., more preferably 245 to 275° C., particularly preferably 245 to 260° C. from the viewpoint of enhancing the desired effect.

The reaction time of the hydrogenation step is preferably 0.5 to 10 hours, more preferably 2 to 6 hours. Hydrogenation can be performed with stirring. Stirring is preferably performed at 50 to 5000 rpm when stirring is performed.

Then, by removing unreacted monomer components, low molecular weight polymerization products, and volatile components such as a solvent from the hydrogenated petroleum resin obtained in the hydrogenation step (d) above as needed (resin drying step (e)), the desired hydrogenated petroleum resin can be obtained.

The technique for the resin drying step is not particularly limited, and for example, a flash distillation device and a thin film evaporator can be suitably used. The range of the softening point can be adjusted by changing drying conditions.

The hydrogenated petroleum resin obtained as described above has good compatibility with a base polymer and a good hue, and has high performance as a tackifying resin.

The softening point of the hydrogenated petroleum resin is usually 70 to 150° C., preferably 80 to 140° C., more preferably 80 to 130° C., particularly preferably 90 to 105° C. For the molecular weight, the Z-average molecular weight (Mz) is usually 1200 to 2600, preferably 1400 to 2400, and more preferably 1600 to 2200.

The aromatic content of the hydrogenated petroleum resin is preferably 2.5 to 12.5%, more preferably 5 to 10%.

The Hazen color number of the hydrogenated petroleum resin when mixed and dissolved with toluene at 50/50 (mass ratio) is preferably 30 or less.

The clouding point of the hydrogenated petroleum resin when mixed and dissolved with an ethylene-vinyl acetate copolymer at 50/50 (mass ratio) is preferably 37.5° C. or less, and more preferably 35° C. or less.

The softening point, the Z-average molecular weight (Mz), the aromatic content, the Hazen color number, and the clouding point can be measured in the same manner as in Examples.

EXAMPLES

Hereinafter, the present invention will be described in detail with reference to Examples, and the present invention is not limited to these Examples.

Measuring methods for the properties and evaluation of the raw material resin and the hydrogenated petroleum resin were based on following methods.

(1) Molecular Weight Measurement

Z-average molecular weight Mz was determined in terms of polystyrene using a high-speed GPC instrument (HLC-8320GPC, manufactured by TOSOH CORPORATION) [Eluent: tetrahydrofuran, Column: G4000HXL, G3000HXL, G2000HXL (two) manufactured by Tosoh Corporation were used in series, detector: RI, standard sample: polystyrene].

(2) Softening Point Measurement

The softening point was measured by ring and ball method in accordance with JIS K-2207 (1991).

(3) Clouding Point Measurement

The clouding point was measured by mixing and dissolving the hydrogenated petroleum resin and ethylene-vinyl acetate copolymer (manufactured by DU PONT-MITSUI POLYCHEMICALS CO., LTD., trade name "Eva Flex EVA-210") at 50/50 (mass ratio) in accordance with JIS K-2269 "Testing Methods for Cloud Point of Petroleum Products". The lower the clouding point, the higher the compatibility between the hydrogenated petroleum resin and the ethylene-vinyl acetate copolymer (base polymer).

(4) Aromatic Content

The aromatic content was calculated from the measurement result of the $^1$H-NMR spectrum determined with a nuclear magnetic resonance apparatus (FT NMR System AL400 manufactured by JEOL Ltd.) using deuterated chloroform as the deuterated solvent.

(5) Hue (Hazen Color Number)

The hue was measured with a colorimeter (Tintometer, Robibond PFX195) using 50% by mass toluene solution of the hydrogenated petroleum resin. When the measured value was 30 or less, the hue (Hazen color number) was regarded as to be good.

Example 1

(1) Production of Hydrogenation Raw Material by Thermal Polymerization of Cyclopentadiene Compound and Vinyl Aromatic Compound 1800 g of Dicyclopentadiene fraction X1 (dicyclopentadiene concentration: 74% by mass) having the composition shown in Table 1 was placed in an autoclave having an internal volume of 5 L and equipped with a stirrer, and the inside of the system was purged with nitrogen. Then, the temperature was increased to 180° C. at 4° C./rain while stirring at 500 rpm. While maintaining the temperature at 180° C., a mixed solution of 530.9 g of styrene and 469.1 g of dicyclopentadiene fraction X1 having the same composition as above was added dropwise over 120 minutes. The reaction solution after the addition dropwise was completed was heated to 260° C. at 1.8° C./min. Then, the reaction solution was heated at 260° C. for 92 minutes to perform a polymerization reaction. Thereby, polymerization reaction product 1 was obtained.

A part of the polymerization reaction product 1 was fractionated, and treated at a temperature of 230° C. under a nitrogen stream for 10 minutes using a rotary evaporator to remove unreacted monomers. Then, the resulting product was treated at a temperature of 230° C. and a pressure of 6.7 kPaA (A indicates an absolute pressure. The same applies hereinafter.) for 15 minutes to partially remove low molecular weight substances, thereby resin P1 was obtained. Properties of the resin P1 are shown in Table 2. The resin P1 was dissolved in ethylcyclohexane to prepare a resin solution having a resin concentration of 47.2% by mass. This solution is referred as to hydrogenation raw material 1.

TABLE 1

| Composition [% by mass] | Dicyclopentadiene fraction X1 |
|---|---|
| Dicyclopentadiene | 74 |
| C5, C6 paraffin | 12 |
| C5, C6 olefin | 2 |
| C10+ | 7 |
| Other | 5 |

(2) Production of Hydrogenated Petroleum Resin 500 g of the hydrogenation raw material 1 obtained in (1) above and 0.47 g of a palladium-supported alumina catalyst were placed in an autoclave having an internal volume of 1 L and equipped with a stirrer, and the inside of the system was purged with hydrogen to perform hydrogenation reaction at a temperature of 250° C. and a hydrogen pressure of 2.0 MPaG (G indicates gauge pressure. The same applies hereinafter.) for 3 hours while stirring at 500 rpm.

After the hydrogenation reaction, the resulting product was treated at a temperature of 210° C. under a nitrogen stream for 20 minutes using a rotary evaporator to remove unreacted monomers. Then, the resulting product was treated at a temperature of 210° C. and a pressure of 0 kPaA for 20 minutes to partially remove low molecular weight substances, thereby a hydrogenated petroleum resin was obtained. Properties of the obtained resin are shown in Table 3.

Example 2

A hydrogenated petroleum resin was obtained in the same manner as in Example 1 except that the hydrogen pressure in Production of hydrogenated petroleum resin (2) in Example 1 was changed to 1.5 MPaG. Properties of the resin are shown in Table 3.

Example 3

A hydrogenated petroleum resin was obtained in the same manner as in Example 1 except that the hydrogen pressure in Production of hydrogenated petroleum resin (2) in Example 1 was changed to 3.0 MPaG. Properties of the resin are shown in Table 3.

Example 4

A hydrogenated petroleum resin was obtained in the same manner as in Example 1 except that the hydrogen pressure in Production of hydrogenated petroleum resin (2) in Example 1 was changed to 4.0 MPaG. Properties of the resin are shown in Table 3.

Example 5

(1) Production of Hydrogenation Raw Material by Thermal Polymerization of Cyclopentadiene Compound and Vinyl Aromatic Compound 864.9 g of Dicyclopentadiene fraction X1 (dicyclopentadiene concentration: 74% by mass) having the composition shown in Table 1 and 935.1 g of xylene were placed in an autoclave having an internal volume of 5 L and equipped with a stirrer, and the inside of the system was purged with nitrogen. Then, the temperature was increased to 260° C. at 4° C./min while stirring at 500 rpm. While maintaining the temperature at 260° C., a mixed solution of 454.9 g of styrene and 545.1 g of xylene was added dropwise over 120 minutes. Then, the mixture was continuously heated at 260° C. for 180 minutes to perform a polymerization reaction. Thereby, polymerization reaction product 2 was obtained.

A part of the polymerization reaction product 2 was fractionated, and treated at a temperature of 230° C. under a nitrogen stream for 15 minutes using a rotary evaporator to remove unreacted monomers. Then, the polymerization reaction product was treated at a temperature of 230° C. and a pressure of 6.7 kPaA for 10 minutes to partially remove low molecular weight substances, thereby a resin P2 was obtained. Properties of the resin P2 are shown in Table 2. The resin P2 was dissolved in ethylcyclohexane to prepare a resin solution having a resin concentration of 47.2% by mass. This solution is referred as to hydrogenation raw material 2.

(2) Production of Hydrogenated Petroleum Resin 500 g of the hydrogenation raw material 2 obtained in (1) above and 0.35 g of a nickel-supported silica-alumina catalyst were placed in an autoclave having an internal volume of 1 L and equipped with a stirrer, and the inside of the system was purged with hydrogen to perform hydrogenation reaction at a temperature of 250° C. and a hydrogen pressure of 2.0 MPaG for 5 hours while stirring at 500 rpm.

After the hydrogenation reaction, the resulting product was treated at a temperature of 210° C. under a nitrogen stream for 20 minutes using a rotary evaporator to remove unreacted monomers. Then, the resulting product was treated at a temperature of 210° C. and a pressure of 0 kPaA for 20 minutes to partially remove low molecular weight substances, thereby a hydrogenated petroleum resin was obtained. Properties of the obtained resin are shown in Table 3.

TABLE 2

| Polymerization resin | P1 | P2 |
|---|---|---|
| Softening point [° C.] | 81 | 86 |
| Mz | 1779 | 1760 |
| Yield [% by mass] | 72.15 | 36.84 |

Example 6

A hydrogenated petroleum resin was obtained in the same manner as in Example 5 except that the amount of the nickel-supported silica-alumina catalyst in Example 5 was changed to 0.47 g. Properties of the resin are shown in Table 3.

Example 7

A hydrogenated petroleum resin was obtained in the same manner as in Example 5 except that the amount of the nickel-supported silica-alumina catalyst in Example 5 was changed to 0.59 g. Properties of the resin are shown in Table 3.

Comparative Example 1

A hydrogenated petroleum resin was obtained in the same manner as in Example 5 except that the amount of the nickel-supported silica-alumina catalyst in Example 5 was changed to 1.18 g. Properties of the resin are shown in Table 3.

Comparative Example 2

A hydrogenated petroleum resin was obtained in the same manner as in Example 5 except that the reaction temperature in Production of hydrogenated petroleum resin (2) in Example 5 was changed to 230° C. Properties of the resin are shown in Table 3.

Comparative Example 3

A hydrogenated petroleum resin was obtained in the same manner as in Example 5 except that the amount of the nickel-supported silica-alumina catalyst in Example 5 was changed to 0.24 g. Properties of the resin are shown in Table 3.

TABLE 3

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Catalyst | Pd-based | Pd-based | Pd-based | Pd-based | Ni-based | Ni-based | Ni-based | Ni-based | Ni-based | Ni-based |
| Amount of catalyst used [parts by mass] (*1) | 0.20 | 0.20 | 0.20 | 0.20 | 0.15 | 0.20 | 0.25 | 0.50 | 0.15 | 0.10 |
| Reaction temperature [° C.] | 250 | 250 | 250 | 250 | 250 | 250 | 250 | 250 | 230 | 250 |
| Reaction pressure [MPaG] | 2.0 | 1.5 | 3.0 | 4.0 | 2.0 | 2.0 | 2.0 | 2.0 | 2.0 | 2.0 |
| Softening point [° C.] | 101 | 100 | 101 | 105 | 98 | 100 | 100 | 102 | 98 | 94 |
| Aromatic content [%] | 8.08 | 9.52 | 6.42 | 5.95 | 7.93 | 7.18 | 7.41 | 4.44 | 7.42 | 11.24 |
| Clouding point [° C.] | 30 | 30 | 30 | 30 | 30 | 30 | 35 | 80 | 35 | 40 |
| Mz | 1847 | 1844 | 1809 | 1784 | 1855 | 1875 | 1852 | 1806 | 1761 | 1754 |
| Hue (Hazen color number) | 10 | 11 | 6 | 3 | 27 | 23 | 23 | 6 | 34 | 50 |

(*1) Amount of catalyst used relative to 100 parts by mass of resin

As shown in Table 3, it found that a hydrogenated petroleum resin having good compatibility with a base polymer and a good hue can be produced under a hydrogen pressure of 4 MPaG or less by hydrogenating a polymerization product under a reaction temperature of 240° C. or higher using 0.125 to 0.4 parts by mass of a catalyst relative to 100 parts by mass of a resin in the polymerization product.

The invention claimed is:

1. A method for producing a hydrogenated petroleum resin, the method comprising hydrogenating a polymerization product of dicyclopentadiene and a vinyl aromatic compound in the presence of a nickel or palladium catalyst, wherein the hydrogenating is performed under the following conditions (A) to (C):
    (A) an amount of the catalyst employed is 0.125 to 0.4 parts by mass relative to 100 parts by mass of a resin in the polymerization product,
    (B) a reaction pressure is 4 MPaG or less; and
    (C) a reaction temperature is 250° C. or higher.

2. The method of claim 1, wherein the polymerization product is obtained by thermally polymerizing the dicyclopentadiene and the vinyl aromatic compound.

3. The method of claim 1, further comprising thermally polymerizing the dicyclopentadiene and the vinyl aromatic compound, to obtain a polymerization product that is employed in the hydrogenating as the polymerization product of the dicyclopentadiene and the vinyl aromatic compound.

4. The method of claim 1, wherein the vinyl aromatic compound is represented by the following formula (1):

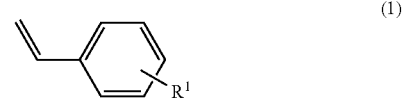

(1)

wherein $R^1$ represents a hydrogen atom, an alkyl group, a cycloalkyl group, an aryl group or an aralkyl group.

5. The method of claim 1, wherein the catalyst is a nickel catalyst.

6. The method of claim 1, wherein the reaction pressure is normal pressure to 4 MPaG.

7. The method of claim 1, wherein the reaction temperature is 250 to 300° C.

8. The method of claim 1, wherein the catalyst is a palladium catalyst.

* * * * *